United States Patent
Herlyn et al.

(10) Patent No.: US 7,503,162 B2
(45) Date of Patent: Mar. 17, 2009

(54) MOWER KNIVES WITH STAGGERED SERRATIONS

(75) Inventors: Ryan Scott Herlyn, Port Byron, IL (US); Jerry Alan Sandau, Orion, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/851,440

(22) Filed: Sep. 7, 2007

(65) Prior Publication Data

US 2008/0173001 A1 Jul. 24, 2008

Related U.S. Application Data

(60) Provisional application No. 60/885,860, filed on Jan. 19, 2007.

(51) Int. Cl.
*A01D 34/13* (2006.01)
(52) U.S. Cl. .......................................... 56/297
(58) Field of Classification Search ................ 56/296, 56/304, 297, 259, 257, 298
See application file for complete search history.

(56) References Cited

U.S. PATENT DOCUMENTS

| 513,834 | A | * | 1/1894 | Smith ........................... 56/299 |
| 2,724,941 | A | * | 11/1955 | Zwiesler ...................... 56/17.6 |
| 2,728,170 | A | * | 12/1955 | Korber ......................... 451/122 |
| 3,066,467 | A | | 12/1962 | Barfield |
| 3,066,468 | A | * | 12/1962 | Kowalik et al. .............. 56/301 |
| 3,098,338 | A | * | 7/1963 | Myers .......................... 56/296 |
| 3,284,994 | A | * | 11/1966 | Hamel .......................... 56/298 |
| 3,517,494 | A | * | 6/1970 | Beusink et al. ............... 56/293 |
| 3,760,571 | A | * | 9/1973 | Foster .......................... 56/298 |
| 4,380,889 | A | * | 4/1983 | Isbell ........................... 56/296 |
| 4,387,554 | A | * | 6/1983 | Bedogni ....................... 56/296 |
| 5,241,811 | A | | 9/1993 | Bolinger |
| 5,431,000 | A | * | 7/1995 | Shuknecht .................... 56/308 |
| 5,979,152 | A | | 11/1999 | McCredie |
| 6,467,246 | B1 | | 10/2002 | McCredie |
| 6,510,681 | B2 | | 1/2003 | Yang et al. |
| 7,124,567 | B1 | | 10/2006 | Adamson et al. |
| 7,313,903 | B2 | * | 1/2008 | Schumacher et al. .......... 56/304 |

(Continued)

FOREIGN PATENT DOCUMENTS

DE 4020114 A1 9/1992

(Continued)

OTHER PUBLICATIONS

European Search Report Dated Mar. 27, 2008, (4 pages).

*Primary Examiner*—Árpád Fábián-Kovács

(57) ABSTRACT

A double knife, that can be unitary or consisting of two separate knives, is configured to be mounted on a reciprocating bar of a reciprocating knife. The double knife comprises two cutting sections extending in a forward direction which is perpendicular to the direction of reciprocation. Each of the cutting sections has two lateral faces with serrated cutting edges. The serrations of one cutting section are offset in the forward direction from the serrations of the other cutting section. The two cutting sections can be provided on a single double knife or on separate knives. Preferably, the stroke of the knives is larger than their width, such that a guard finger interacts with two cutting sections and the wear of the guard finger is reduced, since each of the cutting sections interacts with different locations of the guard finger.

21 Claims, 4 Drawing Sheets

U.S. PATENT DOCUMENTS

2002/0035827 A1 * 3/2002 Yang et al. .................... 56/298
2005/0166566 A1 * 8/2005 Majkrzak .................... 56/246

FOREIGN PATENT DOCUMENTS

| EP | 0875133 | A | 11/1998 |
| EP | 1038427 | A | 9/2000 |
| FR | 2161555 | A | 7/1973 |
| GB | 1249749 | A | 10/1971 |

* cited by examiner

MOWER KNIVES WITH STAGGERED SERRATIONS

This application claims priority to U.S. Provisional Application Ser. No. 60/885,860 filed Jan. 19, 2007.

FIELD OF THE INVENTION

This invention relates to reciprocating knives for cutting stalk-like crop like grass or grain. More particularly, it relates to reciprocating knives having knife sections with serrated cutting edges, wherein the serrations of one knife are staggered with respect to the serrations of an adjacent knife.

BACKGROUND OF THE INVENTION

Reciprocating cutter bar assemblies have been used to cut crops such as wheat, oats, rye, barley and soybeans for over a century. Reciprocating cutter bar assemblies are typically constructed of a number of knives fixed in a row to a knifeback that is driven in reciprocation.

Stationary guard fingers (also called guard points or guard tips) are mounted adjacent to the knives such that when the bar is driven in a reciprocating motion, the knives on the bar engage the stationary guard fingers to cut the crop therebetween.

Prior art knives generally comprise a rectangular base for mounting the knife to the reciprocating bar and have forward trapezoidal or triangular cutting sections with cutting edges that are obliquely arranged to the forward direction of travel. Knives with single cutting sections have been used as well as double knives with twin cutting sections arranged side by side. Usually, the length of all knives in the forward direction is identical, but also knives with staggered forward tips have been described. The cutting edges are smooth or serrated, i.e. provided with small notches for improving the cutting action, and thus comprise a number of troughs and peaks arranged in an alternating fashion.

In the prior art, the peaks of the serrated cutting edges of all knives are lying on parallel lines extending transversely to the forward direction, and the troughs of the cutting edges of all knives are also arranged on parallel lines extending transversely to the forward direction.

One problem with this arrangement is excessive wear on small localized areas of the guard fingers and of the cutting section of the knife, since wear mainly appears at the peaks of the serrations. This is particularly a problem at cutter bar assemblies with a double cut configuration, at which more than one cutting section passes over or through a single guard finger.

It is an object of the invention to provide a twin knife having a cutting section with serrated cutting edges that provides an extended lifetime of a guard finger that interacts with the knives and of the knives.

SUMMARY OF THE INVENTION

A twin knife configured to be mounted on a reciprocating knifeback of a reciprocating cutter bar assembly comprises a first cutting section and a second cutting section. Both cutting sections extend in a forward direction and have at least one lateral face with a serrated cutting edge. The cutting edges comprise a plurality of first troughs and first peaks that are arranged in an alternating manner. Bases are fixed to the rearward ends of the cutting sections and have at least one aperture for receiving a connector to couple the base to the reciprocating knifeback. The serrations of the first cutting edge of the first cutting section and the serrations of the second cutting edge of the second cutting section are arranged in a staggered fashion. Thus, in a state when the first base and the second base are mounted to the bar, the first troughs are offset in the forward direction from the second troughs and the second peaks are offset in the forward direction from the first peaks.

Hence, the first cutting edge and the second cutting edge are interacting during the cutting or mowing operation with different locations of a counteracting shearbar such as a guard finger. Wear of the knives and of the guard finger is thus reduced and their lifetime is increased.

In a preferred embodiment of the invention, the first cutting edge of the first cutting section and the second cutting edge of the second cutting section are arranged on the same (e.g. left or right) side of the longitudinal center plane of the cutting sections. Thus, both said cutting edges interact with the same face of a shearbar or guard finger.

Preferably, each of the cutting section comprises two cutting edges. Hence, the first cutting section has a second lateral face with a third cutting edge. The third cutting edge comprises a plurality of third troughs and third peaks that are arranged in an alternating manner. Also, the second cutting section has a second lateral face with a fourth cutting edge. The fourth cutting edge comprises a plurality of fourth troughs and fourth peaks that are arranged in an alternating manner. The serrations of the fourth edge and those of the third edge are arranged in a staggered manner. Thus, the cutting sections can have a trapezoidal or triangular shape with two lateral cutting edges and a pointed or flattened tip, the latter extending transversely to the forward direction. The described reduced wear is achieved on both sides of the guard finger and all four cutting edges of both knives.

In an embodiment, the troughs of the first cutting section can be aligned with the peaks of the second cutting section and vice versa, i.e. an imaginary line extending through a first trough and a third trough intersects a second peak and a fourth peak, and an imaginary transverse line extending through a first peak and a third peak intersects a second trough and a fourth trough. In other words, the third troughs and third peaks are aligned in the forward direction with the first troughs and first peaks of the first cutting edge of the first cutting section, while the fourth troughs and fourth peaks are aligned in the forward direction with the second troughs and second peaks of the second cutting edge of the second cutting section. It should however be noted that it would be possible to align a first trough with a third peak and a second peak and a fourth trough (and a first peak with a third trough and a second trough and a fourth peak), since staggering the serrations on identical lateral sides of the cutting sections is the main feature of the present invention. Also, staggering the serrations by smaller values as previously described lies within the scope of the present invention. For example, the troughs of the first cutting edge can be transversely aligned in the forward direction with locations lying between the troughs and peaks of the second cutting edge.

The knife arrangement comprising first base, the second base, the first cutting section and the second cutting section can be produced (e.g. cast or cut) as a single, unitary piece. Alternatively, the first cutting section and the first base are formed as a single part, and the second cutting section and the second base are another, independent single part.

In a preferred embodiment, a forward tip of the first cutting section is in the forward direction offset from a forward tip of the second cutting section. In another embodiment, both tips can however be aligned.

The twin knife and the reciprocating cutter bar assembly can be used on any type of harvesting machines, for example on platforms for combines or grass mowers.

These and other objects, features and advantages of the present invention will become apparent to one skilled in the art upon reading the following detailed description in view of the drawings.

DESCRIPTION OF THE PREFERRED EMBODIMENT

Figure 1:
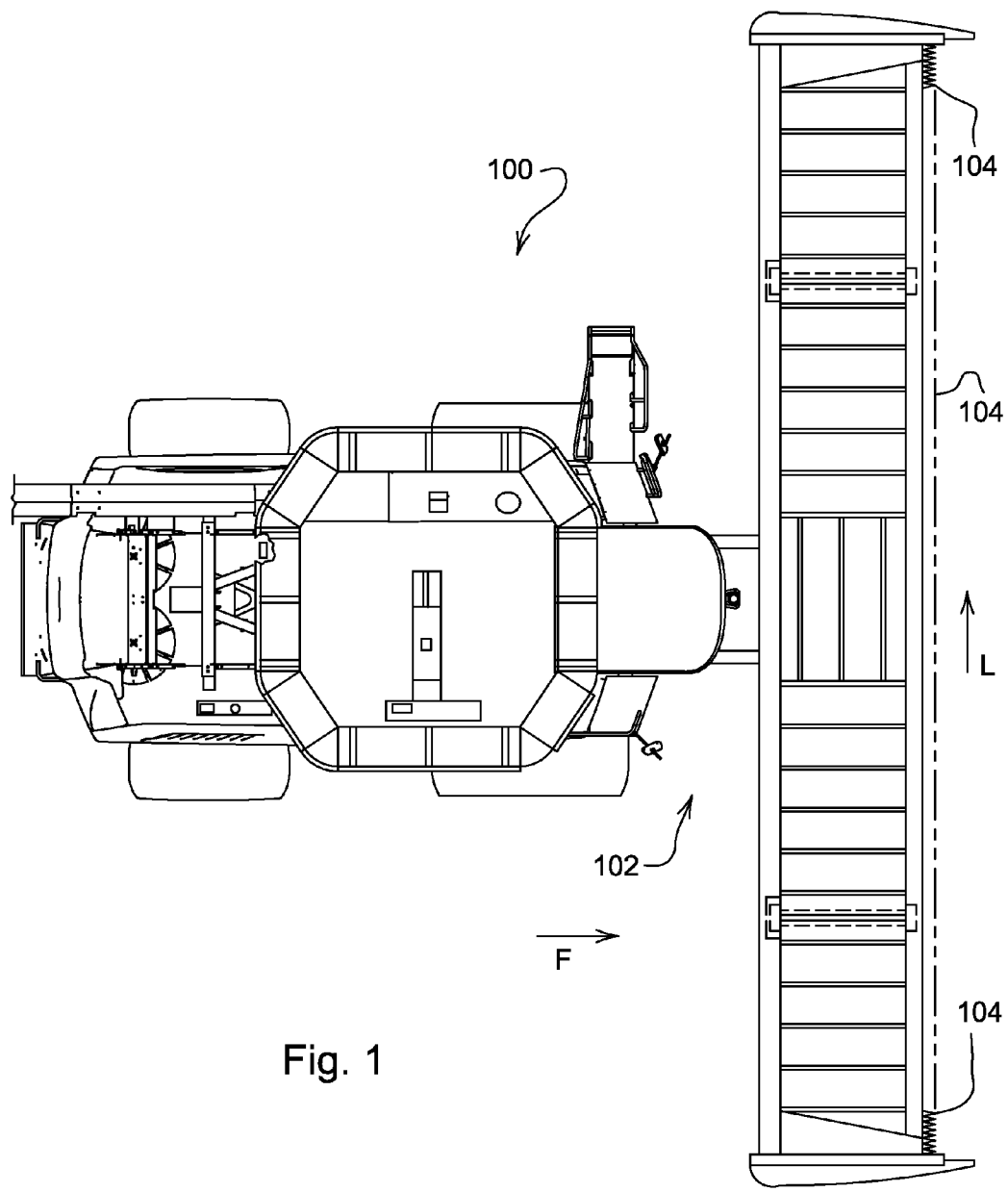
FIG. 1 is a plan view of a combine with a header having a reciprocating cutter bar assembly in accordance with the present invention.

Referring now to FIG. 1, a combine 100 is shown having a header 102 coupled thereto, that is configured to be driven through an agricultural field in a forward direction "F" of the combine to cut crop material. In the following, all directional references, like forward, left, right, and lateral, are given with respect to the forward direction of combine 100.

Header 102 has an elongate reciprocating cutter bar assembly 104 that extends along a forward edge of the header 102 to engage and cut crop plants as the combine 100 moves in the forward direction "F" through the field.

Figure 2:
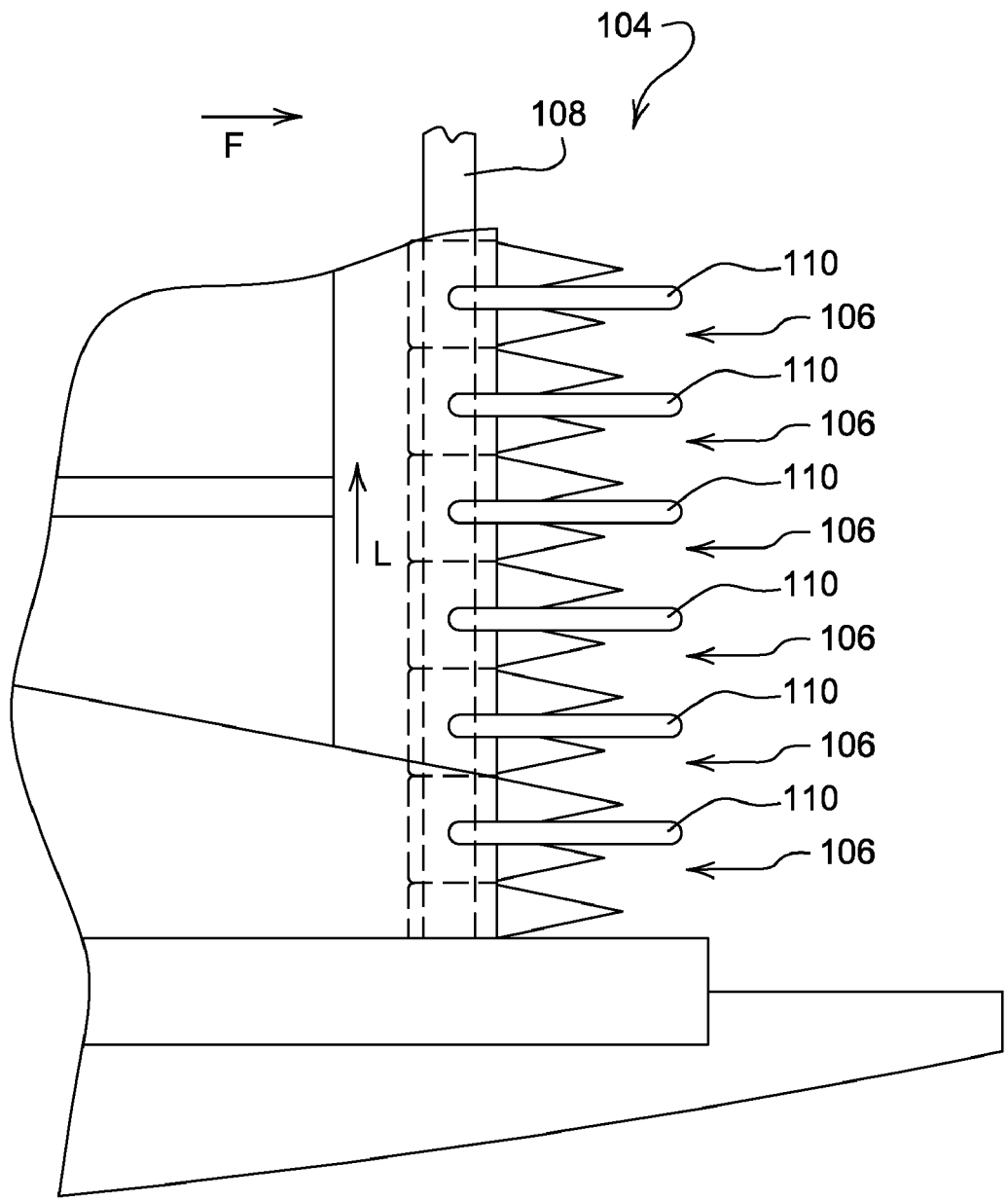
FIG. 2 is a fragmentary detail plan view of the header of FIG. 1 showing a plurality of knives mounted in a row and guard fingers cutting against of the reciprocating knives of the cutter bar assembly of FIG. 1. The knife sections are shown in simplified form without serrations for clarity of illustration.

FIG. 2 is a detailed view of the right end of header 102 showing details of the reciprocating cutter bar assembly 104 which includes a plurality of twin knives 106 that are mounted in a long row to a reciprocating bar or knifeback 108. Reciprocating cutter bar assembly 104 also includes stationary guard fingers 110 that extend forward and are disposed adjacent to each twin knife 106 such that at least two adjacent cutting sections of the twin knives 106 cut against one side of the guard finger 110 during a complete reciprocation cycle.

Figure 3:
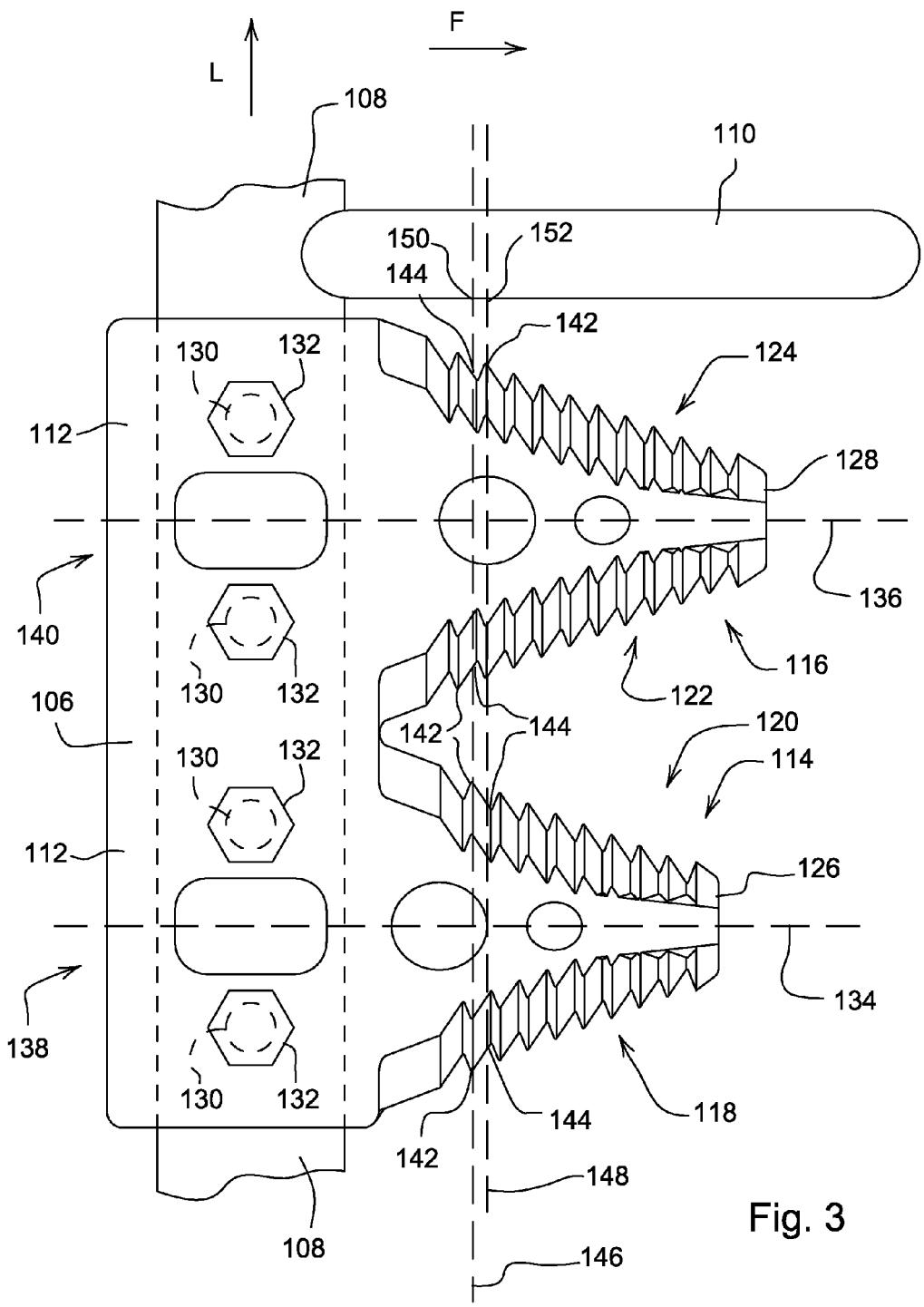
FIG. 3 is a plan view of a representative twin knife of the plurality of knives of FIG. 2 with all components of the header removed except the reciprocating bar to which the representative twin knife is mounted and the guard finger against which the cutting sections of the representative twin knife cut the crop matter.

FIG. 3 is a plan view of a double knife 106. Each double knife 106 has a common, unitary base 112 to which two cutting sections 114, 116 are fixed. The cutting sections 114, 116 are generally triangular and each has two lateral faces with cutting edges 118, 120, 122, 124 respectively. In particular, the first cutting section 114 has a first cutting edge 118 at the right hand side of its longitudinal center plane 134 and a third cutting edge 120 at the left hand side of its longitudinal center plane 134. Likewise, the second cutting section 116 has a second cutting edge 122 at the right hand side of its longitudinal center plane 136 and a fourth cutting edge 124 at the left hand side of its longitudinal center plane 136.

Base 112 has several apertures 130 that receive bolts 132. Bolts 132 are threaded into the reciprocating knifeback 108 to fix the twin knife 106 thereto in parallel relation along the entire length of the reciprocating knifeback 108. The first cutting section 114 and its associated part of the base 112 behind it define a first knife 138, while the second cutting section 116 and its associated part of the base 112 behind it define a second knife 140.

The cutting edges 118, 120 of the first cutting section 114 are shorter than the cutting edges 122, 124 of the second cutting section 116. The cutting edges 118, 120 terminate at a tip 126 of the first cutting section 114. Cutting edges 122, 124 are longer than the cutting edges 118, 120 and terminate at a tip 128 of the second cutting section 116. The tip 126 of the first cutting section 114 is offset behind (i.e. to the rear of) the tip 128 of the second cutting section 116.

All four cutting edges 118, 120, 122, 124 are serrated and thus comprise a number of peaks 142 and troughs 144 arranged in an alternating manner. The peaks 142 of the first cutting edge 118 are—in the forward direction F—aligned with the peaks 142 of the third cutting edge 120, hence two peaks 142 having the same forward position are positioned on a transversely extending imaginary line 146. This imaginary line 146 also (at least approximately) extends through two troughs 144 of the second cutting edge 122 and of the fourth cutting edge 124. The two troughs 144 of the second cutting edge 122 and of the fourth cutting edge 124 are also aligned in the forward direction.

Analogously, the troughs 144 of the first cutting edge 118 are—in the forward direction F—aligned with the troughs 144 of the third cutting edge 120, hence two troughs 144 having the same forward position are positioned on a transversely extending imaginary line 148. This imaginary line 148 also (at least approximately) extends through two peaks 142 of the second cutting edge 122 and of the fourth cutting edge 124. The two peaks 142 of the second cutting edge 122 and of the fourth cutting edge 124 are also aligned in the forward direction.

The stroke of the knifeback 108 is such that both cutting sections 114, 116 pass below and/or above the guard finger 110, which acts as a shearbar to cut the crop. Since the serrations of both cutting sections 114 and 116 are offset or staggered by half a serration tooth pitch, crop caught by the second cutting section 116 is mainly cut between the peaks 142 of the second cutting section 116 and the guard finger 110 at a location 152 on line 148 (and all other imaginary lines connecting forwardly aligned peaks 142 of the second cutting section 116), while crop caught by the first cutting section 114 is mainly cut between the peaks 142 of the first cutting section 114 and the guard finger 110 at a location 150 on line 146 (and all other imaginary lines connecting forwardly aligned peaks 142 of the first cutting section 116) on both sides of the guard finger 110 due to the reciprocating motion of the knifeback 108. Thus, the cutting action is more evenly distributed along the length of the guide finger 110 and wear both of the guide finger 110 as well as of the cutting sections 114, 116 is reduced over the prior art.

Figure 4:
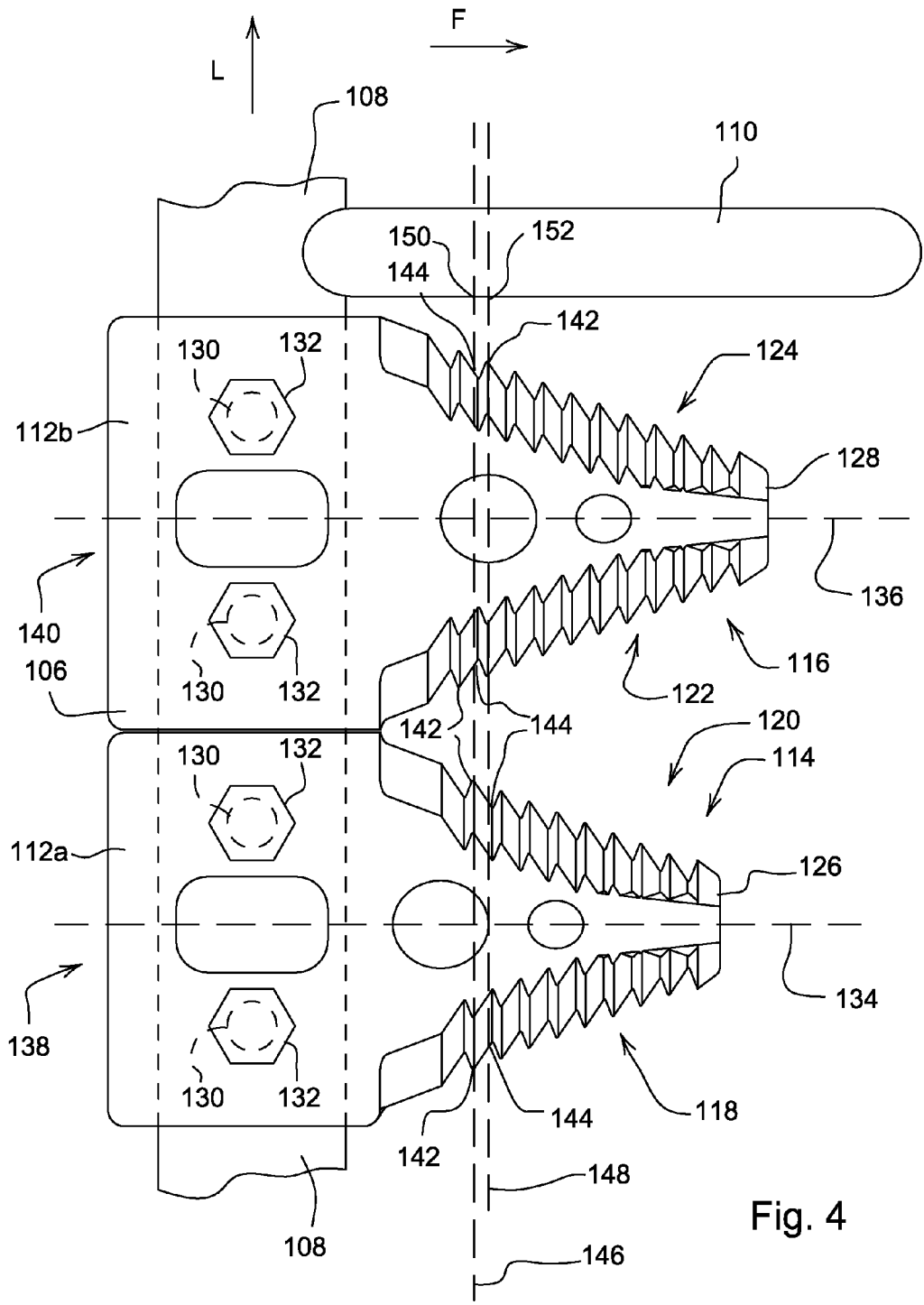
FIG. 4 is a plan view of another embodiment of a twin knife of the plurality of knives of FIG. 2.

In the embodiment of FIG. 4, elements corresponding to the elements of FIG. 3 have been assigned the same reference numerals. The main difference is that separate bases 112a, 112b have been assigned to the cutting sections 114, 116. The first knife 138 and the second knife 140 are hence separately mounted to the knifeback 108.

Having described the preferred embodiment, it will become apparent that various modifications can be made without departing from the scope of the invention as defined in the accompanying claims.

The invention claimed is:

1. A knife arrangement configured to be mounted on a reciprocating knifeback of a reciprocating cutter bar assembly, the twin knife comprising:

a first cutting section extending in a forward direction and having a first lateral face with a serrated first cutting edge, the first cutting edge comprising a plurality of first troughs and first peaks that are arranged in an alternating manner;

a first base fixed to a rearward end of the first cutting section and having at least one aperture for receiving a connector to couple the first base to the reciprocating knifeback;

a second cutting section extending in the forward direction and having a first lateral face with a serrated second cutting edge, the second cutting edge comprising a plurality of second troughs and second peaks that are arranged in an alternating manner; and a second base fixed to a rearward end of the second cutting section and having at least one aperture for receiving a connector to couple the second base to the reciprocating knifeback;

wherein, when the first base and the second base are mounted to the bar, the first troughs on the lateral face are offset in the forward direction from the second troughs on the lateral face and the second peaks are offset in the forward direction from the first peaks on the respective lateral faces.

2. The knife arrangement according to claim 1, wherein the first cutting edge and the second cutting edge are on identical sides of a longitudinal center plane of the first and second cutting section, respectively.

3. The knife arrangement according to claim 2, wherein the first cutting section has a second lateral face with a third cutting edge, the third cutting edge comprising a plurality of third troughs and third peaks that are arranged in an alternating manner and wherein the second cutting section has a second lateral face with a fourth cutting edge, the fourth cutting edge comprising a plurality of fourth troughs and fourth peaks that are arranged in an alternating manner, wherein when the first base and the second base are mounted to the bar, the third troughs are offset in the forward direction from the fourth troughs and the third peaks are offset in the forward direction from the fourth peaks.

4. The knife arrangement according to claim 3, wherein the third troughs and third peaks are aligned in the forward direction with the first troughs and first peaks of the first cutting edge of the first cutting section, respectively and wherein the fourth troughs and fourth peaks are aligned in the forward direction with the second troughs and second peaks of the second cutting edge of the second cutting section, respectively.

5. The knife arrangement according to claim 1, wherein the first base and the second base are unitary.

6. The knife arrangement according to claim 1, wherein the first base and the second base are separate.

7. The knife arrangement according to claim 1, wherein a forward tip of the first cutting section is offset from a forward tip of the second cutting section.

8. A reciprocating cutter bar assembly for use in an agricultural machine, the cutter bar assembly having a direction of reciprocation and comprising:

an elongate knifeback;

a plurality of knives connected to said elongate knifeback, the plurality of knives including first knives and second knives distributed over the length of the knifeback in an alternating manner, wherein the first knives each comprise a first cutting section and a first base, the first cutting section extending in a forward direction perpendicular to the direction of reciprocation and having a lateral face with a serrated first cutting edge, the first cutting edge comprising a plurality of first troughs and first peaks that are arranged in an alternating manner;

the first base fixed to a rearward end of the first cutting section and coupled to the knifeback by a connector;

the second knives each comprise a second cutting section and a second base, the second cutting section extending in the forward direction and having a lateral face with a serrated second cutting edge, the second cutting edge comprising a plurality of second troughs and second peaks that are arranged in an alternating manner;

the second base fixed to a rearward end of the second cutting section and coupled to the knifeback by a connector, wherein the first troughs on the lateral face are offset in the forward direction from the second troughs on the lateral face and the second peaks are offset in the forward direction from the first peaks on the respective lateral faces.

9. The reciprocating cutter bar assembly according to claim 8, further comprising a plurality of stationary guard fingers disposed adjacent to the knives.

10. The reciprocating cutter bar assembly according to claim 9, wherein a stroke of the reciprocating knifeback exceeds a width of a knife, such that during operation, more than one knife passes over a single guard finger.

11. The reciprocating cutter bar assembly according to claim 8, wherein the first cutting edge and the second cutting edge are on identical sides of a longitudinal center plane of the first and second cutting section, respectively.

12. The reciprocating cutter bar assembly according to claim 11, wherein the first cutting section has a second lateral face with a third cutting edge, the third cutting edge comprising a plurality of third troughs and third peaks that are arranged in an alternating manner and wherein the second cutting section has a second lateral face with a fourth cutting edge, the fourth cutting edge comprising a plurality of fourth troughs and fourth peaks that are arranged in an alternating manner, wherein when the first base and the second base are mounted to the bar, the third troughs are offset in the forward direction from the fourth troughs and the third peaks are offset in the forward direction from the fourth peaks.

13. The reciprocating cutter bar assembly according to claim 12, wherein the third troughs and third peaks are aligned in the forward direction with the first troughs and first peaks of the first cutting edge of the first cutting section, respectively and wherein the fourth troughs and fourth peaks are aligned in the forward direction with the second troughs and second peaks of the second cutting edge of the second cutting section, respectively.

14. The reciprocating cutter bar assembly according to claim 8, wherein the first base and the second base are unitary.

15. The reciprocating cutter bar assembly according to claim 8, wherein the first base and the second base are separate.

16. The reciprocating cutter bar assembly according to claim 8, wherein a forward tip of the first cutting section is offset from a forward tip of the second cutting section.

17. An agricultural machine comprising a supporting structure and a harvesting platform coupled to said supporting structure, said harvesting platform being equipped with a reciprocating cutter bar assembly having a direction of reciprocation, the cutter bar assembly comprising:

an elongate knifeback;

a plurality of knives connected to said elongate knifeback, the plurality of knives including first knives and second knives distributed over the length of the knifeback in an alternating manner;

a plurality of stationary guard fingers disposed adjacent to the knives; wherein:

a stroke of the reciprocating knifeback exceeds a width of a knife, such that during operation, more than one knife passes over a single guard finger;

the first knives each comprise a first cutting section and a first base, the first cutting section extending in a forward direction perpendicular to the direction of reciprocation and having a first lateral face with a serrated first cutting edge and a second lateral face with a serrated third cutting edge;

the second knives each comprise a second cutting section and a second base, the second cutting section extending in the forward direction and having a first lateral face with a serrated second cutting edge and a second lateral face with a serrated fourth cutting edge;

the first cutting edge and the second cutting edge are on identical sides of a longitudinal center plane of the first and second cutting section, respectively;

the third cutting edge and the fourth cutting edge are on identical sides of a longitudinal center plane of the first and second cutting section, respectively;

the first cutting edge comprising a plurality of first troughs and first peaks that are arranged in an alternating manner, the third cutting edge comprising a plurality of third troughs and third peaks that are arranged in an alternating manner; the first base fixed to a rearward end of the first cutting section and coupled to the knifeback by a connector;

the second cutting edge comprising a plurality of second troughs and second peaks that are arranged in an alternating manner, the fourth cutting edge comprising a plurality of fourth troughs and fourth peaks that are arranged in an alternating manner; the second base fixed to a rearward end of the second cutting section and coupled to the knifeback by a connector, the first troughs on the lateral face are offset in the forward direction from the second troughs on the lateral face and the second peaks on the lateral face are offset in the forward direction from the first peaks on the lateral face, the third troughs are offset in the forward direction from the fourth troughs and the third peaks are offset in the forward direction from the fourth peaks on the respective lateral faces.

18. The agricultural machine according to claim 17, wherein the third troughs and third peaks are aligned in the forward direction with the first troughs and first peaks of the first cutting edge of the first cutting section, respectively and wherein the fourth troughs and fourth peaks are aligned in the forward direction with the second troughs and second peaks of the second cutting edge of the second cutting section, respectively.

19. The agricultural machine according to claim 17, wherein the first base and the second base are unitary.

20. The agricultural machine according to claim 17, wherein the first base and the second base are separate.

21. The agricultural machine according to claim 17, wherein a forward tip of the first cutting section is offset from a forward tip of the second cutting section.

* * * * *